United States Patent [19]

Tank et al.

[11] Patent Number: 5,377,659
[45] Date of Patent: Jan. 3, 1995

[54] WIRE SAW

[76] Inventors: Klaus Tank, 9 Warbleton Avenue, Essexwold, Transvaal; Peter N. Tomlinson, 315 Enford Road, Mondeor, Transvaal, both of South Africa

[21] Appl. No.: 124,003

[22] Filed: Sep. 21, 1993

[30] Foreign Application Priority Data

Sep. 21, 1992 [ZA] South Africa .................. 92/7204

[51] Int. Cl.⁶ .................................. B28D 1/08
[52] U.S. Cl. ................................. 125/21; 125/22; 83/651.1
[58] Field of Search .............. 125/22, 21, 18; 83/651.1

[56] References Cited

U.S. PATENT DOCUMENTS

| 2,679,839 | 6/1954 | Metzger | 125/21 |
| 2,773,495 | 12/1956 | Lefevre | 125/21 |
| 3,884,212 | 5/1975 | Armstrong et al. | 125/21 |
| 4,674,474 | 6/1987 | Baril | 125/21 |
| 4,856,490 | 8/1989 | Kawase et al. | 125/21 |

FOREIGN PATENT DOCUMENTS

| 0160625 | 11/1985 | European Pat. Off. . |
| 0317965 | 5/1989 | European Pat. Off. . |
| 0364322 | 4/1990 | European Pat. Off. ......... 125/21 |
| 1203000 | 1/1960 | France ............................ 125/21 |
| 2545347 | 4/1977 | Germany ....................... 125/21 |
| 1620311 | 1/1991 | U.S.S.R. ......................... 125/21 |

*Primary Examiner*—Robert A. Rose
*Attorney, Agent, or Firm*—Oblon, Spivak, McClelland, Maier & Neustadt

[57] ABSTRACT

The wire saw including a rope, abrasive beads spaced longitudinally apart on the rope by elastic spacers and elastic sleeves, one for each bead, sandwiched between the respective beads and the rope. The sleeves are conveniently made of rubber which is vulconized to the rope and to the beads.

8 Claims, 2 Drawing Sheets

WIRE SAW

BACKGROUND TO THE INVENTION

Field of the Invention

This invention relates to a wire saw.

Discussion of the Background

Wire saws, such as are commonly used to cut concrete, stone, marble and the like, have a flexible rope on which numerous abrasive beads are mounted in regularly spaced relationship. The beads may, for instance, have diamond particles exposed at their peripheries to perform the necessary cutting action. The rope is formed into an endless loop and is driven at a high linear speed against the workpiece which is to be cut.

When the wire saw is cutting, say laterally, through a workpiece such as a lump of stone, the abrasive beads are subjected to vertical and horizontal forces transverse to the rope and also to longitudinal forces acting along the rope. Random shock fluctuations in these forces can take place as the abrasive beads encounter relatively harder inclusions in the workpiece. The shock loading on the abrasive beads can damage the beads, particularly if the beads are rigidly fixed to the rope, for instance by brazing.

In addition to the transverse and longitudinal forces, the abrasive beads are also subjected to rotational forces as a result of the tendency of the rope to rotate. If the beads are freely rotatable on the rope, as opposed to being rigidly fixed, they are prone to rapid wear as a result of vibrations. Also, a freely rotatable bead will tend at an early stage to develop a flat wear area which then presents itself continuously to the workpiece, resulting in rapid wear in a localized area of the bead surface.

SUMMARY OF THE INVENTION

According to the invention, there is provided a wire saw comprising a rope, a plurality of abrasive beads located on the rope and elastic spacers located about the rope between the beads to space the beads longitudinally apart from one another on the rope, the wire saw further comprising a plurality of discrete, elastic sleeves which are provided one for each bead and which are separate from the spacers, the sleeves being sandwiched between the respective beads and the rope.

The sleeves may be molded of an elastomeric material and are bonded to the rope and to the beads. In a case where the sleeves are of a suitable natural or synthetic rubber, possibly a polyurethane rubber, they may be vulconized to the rope and to the beads.

The elastic spacers may comprise tubular lengths of elastic material, separate from the sleeves and located about the rope between the abrasive beads. Alternatively, they may comprise helical springs located about the rope between the abrasive beads. In the latter case, there may be washers located about the rope at the ends of the abrasive beads, the helical springs acting against the washers.

In one version of the invention, each bead includes at least two bead portions separated by a transverse, elastic gasket, typically provided by a flange extending transversely from the sleeve. The sleeve and the flange can conveniently be formed in one piece.

BRIEF DESCRIPTION OF THE DRAWINGS

The invention will now be described in greater detail, by way of example only, with reference to the accompanying drawings in which.

DESCRIPTION OF PREFERRED EMBODIMENTS

Figure 1:
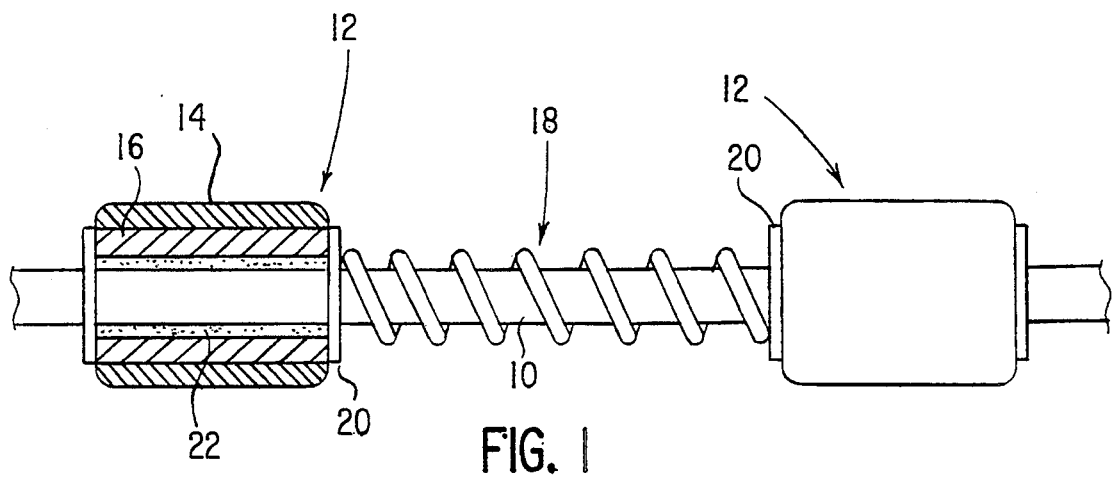
FIG. 1 shows a partly sectioned view of a portion of a wire saw according to the invention.
Figure 2:
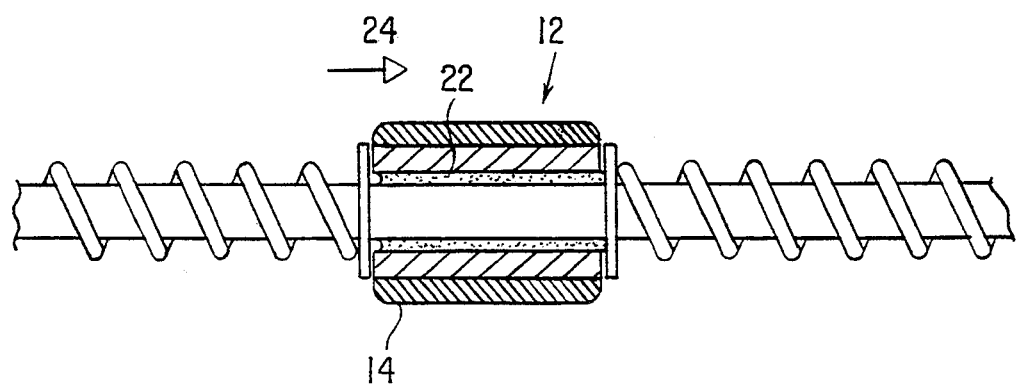
FIG. 2 shows how an elastic sleeve can deform longitudinally.
Figure 3:
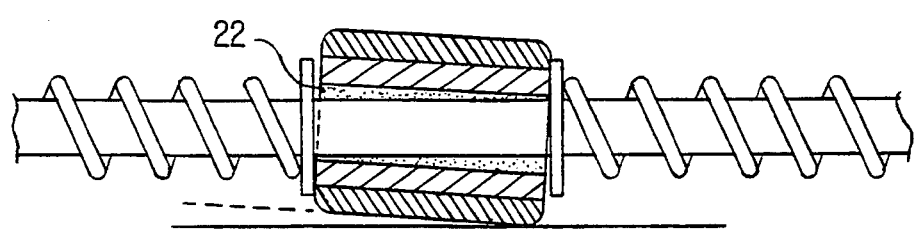
FIG. 3 shows how an elastic sleeve can deform laterally.

A first embodiment of the invention is seen in FIGS. 1 to 3. In these Figures, a portion of the multi-strand wire rope of a wire saw is indicated by the numeral 10. The rope 10 carries a series of longitudinally spaced abrasive beads 12 each of which has an abrasive outer surface 14, typically provided by diamond particles in a metal matrix, located about a tubular steel core 16.

In FIG. 1, the longitudinal spacing of the beads 12 is maintained by elastic spacers in the form of helical springs 18 located about the rope 10 and bearing at each end against steel washers 20. In other embodiments (not illustrated), the elastic spacers could take the form of elastic sleeves, typically of rubber, located about the rope 10.

Each bead 12 includes an elastic sleeve 22 sandwiched between the steel core 16 and the rope 10. The sleeves 22 are typically molded in rubber and are bonded to the steel core and to the rope 10 by a vulconizing process. In practice, a sleeve 22 can be bonded inside a core 16 and then subsequently be bonded to the rope. Alternatively, the bonding of the sleeve to both the core and the rope can be carried out simultaneously.

In use, the rope 10 is formed into an endless loop and is driven longitudinally against a workpiece so that the beads 12 perform a cutting action. During such operation, the elastic sleeves 22 serve to cushion the beads 12 against the longitudinal and transverse loads imposed on it. For instance, referring to FIG. 2, it will be seen that the sleeve is able to deform longitudinally under the longitudinal force applied to the bead 12 when the rope moves in the direction 24, to permit a small amount of longitudinal movement of the bead 12 relative to the rope 10. Figure 3 shows how the sleeve 22 can deform laterally to permit some skewing of the bead 12 relative to the rope. This may for instance take place if the bead encounters a particularly hard section of the workpiece.

It will also be appreciated that the elastic sleeves 22 will permit some resilient, rotational movement of the bead on the rope in response to torsional forces that may be imposed during operation.

Figure 4:
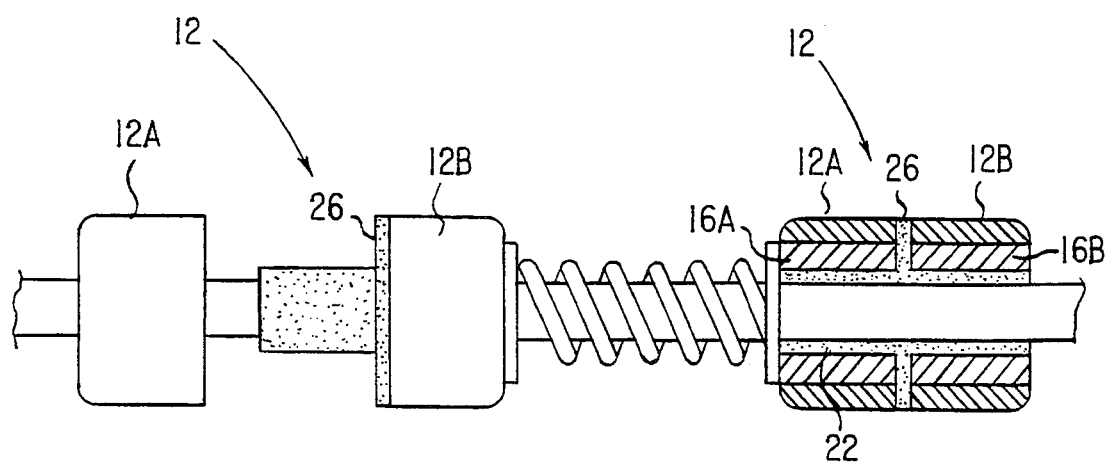
FIG. 4 illustrates, partially exploded and partially in cross-section, a second embodiment of the invention.

FIG. 4 illustrates a second embodiment of the invention. In this case, the bead 12 is composed of two parts 12A and 12B. Each part has a tubular steel core part 16A, 16B. There is once again an elastic sleeve 22. In the assembled state seen in cross-section on the right hand side of FIG. 4, the bead parts 12A and 12B are spaced longitudinally apart from one another by an elastic gasket which is provided by an integral flange 26 extending from the sleeve 22.

Figure 5:
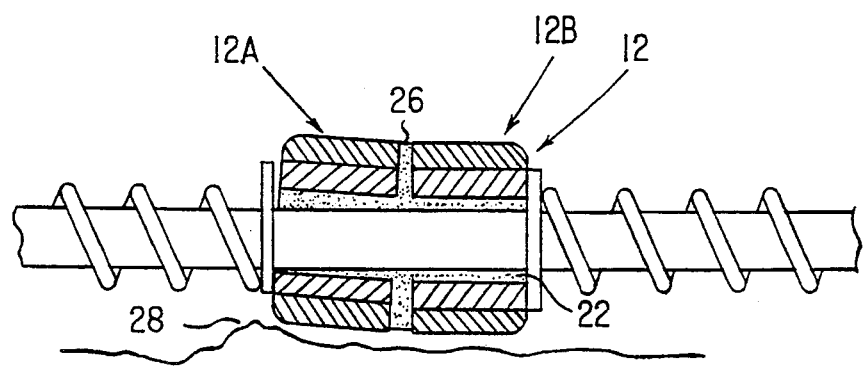
FIG. 5 shows how the elastic sleeve and gasket can deform.

The flange 26 serves to cushion the bead parts relative to one another and permits them to flex relative to one another about an axis transverse to the rope 10. Such flexure is illustrated in FIG. 5, which shows the bead 12 encountering a particularly hard protrusion 28 on the workpiece. In this situation, both the sleeve 22 and the flange 26 deform as appropriate to allow the bead to negotiate the hard protrusion without undue shock loading thereon.

In practice, as illustrated in the partially exploded view on the left hand side of FIG. 4, the sleeve is bonded over its entire length to the rope 10, and one end is bonded inside the core part 16B. The core part 16A of the bead part 12A is then slipped over and bonded to the opposite end of the sleeve. Alternatively, both bead parts can be bonded to the sleeve, and the sleeve bonded to the rope, in one operation.

Obviously, numerous modifications and variations of the present invention are possible in light of the above teachings. It is therefore to be understood that within the scope of the appended claims, the invention may be practiced otherwise than as specifically described herein.

We claim:

1. A wire saw comprising a rope, a plurality of abrasive beads located on the rope and elastic spacers located about the rope between the beads to space the beads longitudinally apart from one another on the rope, the wire saw including a plurality of discrete, elastic sleeves which are provided one for each bead and which are separate from the spacers, the sleeves being sandwiched between the respective beads and the rope, wherein each bead includes at least two bead portions separated by an elastic gasket provided by a flange extending transversely from the sleeve.

2. A wire saw according to claim 1 wherein the sleeves are molded of an elastomeric material and are bonded to the rope and to the beads.

3. A wire saw according to claim 2 wherein the sleeves are of rubber.

4. A wire saw according to claim 3 wherein the sleeves are vulcanized to the rope and to the beads.

5. A wire saw according to claim 1 wherein the elastic spacers comprise tubular lengths of elastic material, separate from the sleeves and located about the rope between the abrasive beads.

6. A wire saw according to claim 1 wherein the elastic spacers comprise helical springs located about the rope between the abrasive beads.

7. A wire saw according to claim 6 and comprising washers located about the rope at the ends of the abrasive beads, the helical springs acting against the washers.

8. A wire saw according to claim 1 wherein the sleeve and the flange are formed in one piece.

* * * * *